H. ROHRBECK.
REFRIGERATOR BOX.
APPLICATION FILED SEPT. 15, 1917.
1,315,334.
Patented Sept. 9, 1919.
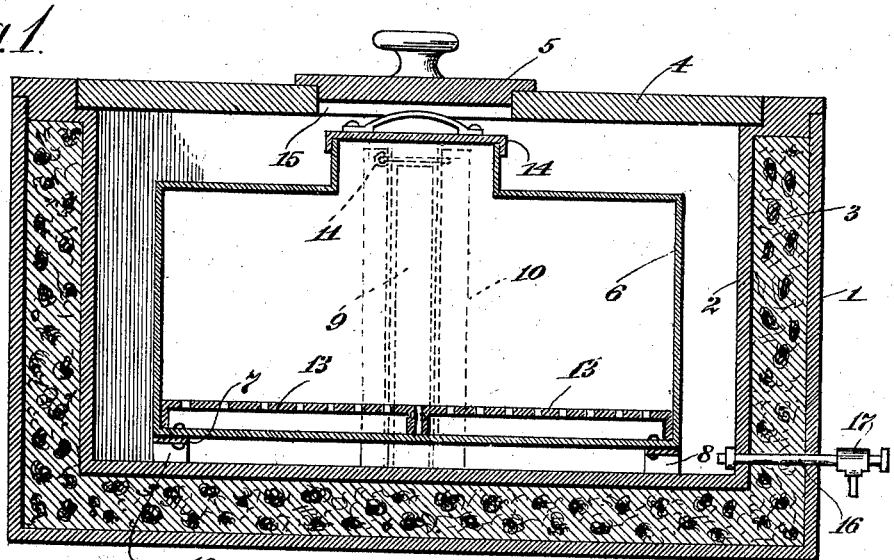
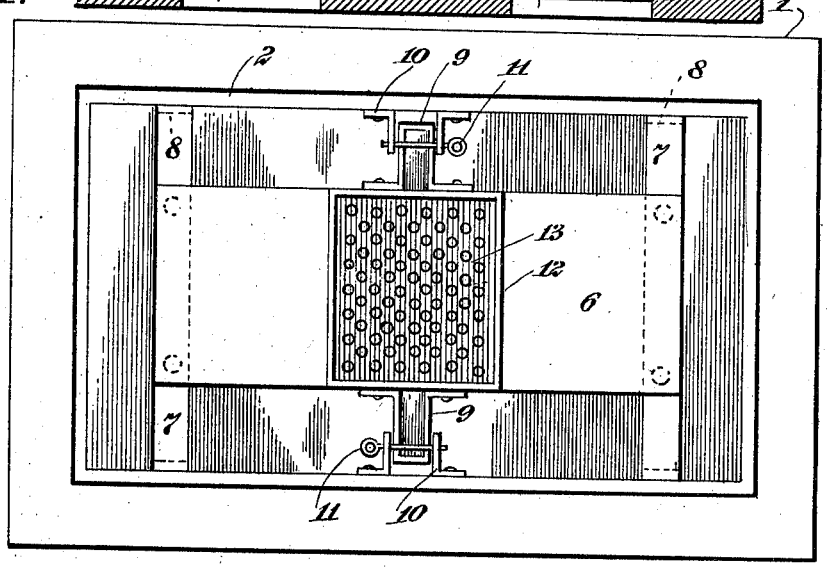
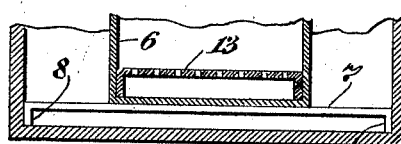
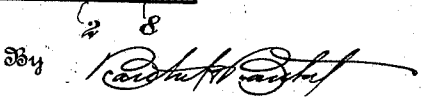
Inventor
Herman Rohrbeck.
Witness
Charles Belg.
Karl H. Butler
By
Attorneys

UNITED STATES PATENT OFFICE.

HERMAN ROHRBECK, OF DETROIT, MICHIGAN.

REFRIGERATOR-BOX.

1,315,334.  Specification of Letters Patent.  Patented Sept. 9, 1919.

Application filed September 15, 1917. Serial No. 191,506.

*To all whom it may concern:*

Be it known that I, HERMAN ROHRBECK, a citizen of the United States of America, residing at Detroit, in the county of Wayne and State of Michigan, have invented certain new and useful Improvements in Refrigerator-Boxes, of which the following is a specification, reference being had therein to the accompanying drawings.

This invention relates to a refrigerator box, and has special reference to an ice cream cabinet that may be advantageously used by the dispensers of ice cream and frozen edibles for storing and preserving ice cream particularly in brick form.

The primary object of my invention is to provide a refrigerator box or cabinet in which brick ice cream and other matter can be conveniently placed therein and removed without disturbing the refrigeratory agent or quantities of brick cream in the box or cabinet.

Another object of my invention is to provide an ice cream cabinet embodying an insulated box in which may be placed a receptacle and a refrigeratory agent, as ice or brine, the receptacle being so arranged as to have the greater part thereof protected against warm air when ice cream is being removed from the receptacle, and it is therefore apparent that the cream is not unduly exposed during its removal. Means are employed for holding the receptacle against flotation within the box or the cooling agent, such means securing a correct position of the receptacle so that it will at all times be surrounded by the cooling agent.

A further object of my invention is to provide a refrigerating box or ice cream cabinet wherein the parts are constructed with a view of reducing the cost of manufacture, and at the same time retain those features by which durability, ease of assembling and a high degree of refrigeration are secured.

With such ends in view, my invention resides in the novel construction, combination and arrangement of parts to be hereinafter more fully described and then claimed.

Reference will now be had to the drawings, wherein

Figure 1 is a longitudinal sectional view of a refrigerating box or ice cream cabinet;

Fig. 2 is a plan of the same with the main box or cabinet lid removed,

Fig. 3 is a cross sectional view of the inner shell of the box or cabinet, and

Fig. 4 is a longitudinal sectional view of a modified form of main lid.

An ice cream cabinet in accordance with my invention comprises a box like structure having an outer shell 1, an inner shell 2 in spaced relation thereto, the space between said shells being filled with an insulating material, as charcoal or mineral wool. The inner and outer shells are braced relative to each other and the upper edge of the inner shell forms a seat for a lid 4 having a small central auxiliary lid 5, the former being removed when a refrigeratory agent, as ice, is to be placed in the inner shell, or when the cabinet is to be cleansed. The auxiliary lid 5 is removed when it is desired to obtain brick ice cream or other matter contained within the cabinet.

In the inner shell 2 is an oblong receptacle 6 having the walls thereof in spaced relation to the shell 2 and the lid 4. The ends of the receptacle 6 are provided with transverse cleats 7 of greater width than said receptacle, said cleats having depending ends or feet 8 which rest upon the shell 2 engaging the side walls thereof as best shown in Fig. 3, and retaining the receptacle 6 in spaced relation to the bottom and side walls of the inner shell. The side walls of the receptacle 6, intermediate the ends thereof, have channel members 9 extending into guides 10 carried by the inner walls of the shell 2, said guides being preferably made of channel bars disposed in spaced parallel relation and suitably connected to the side walls of the inner shell. The members 9 are of less depth than the guides 10 and the upper ends of the guides are adapted to support transverse pins or members 11 which may be easily placed in position to lock the receptacle 6 in the inner shell and against flotation therein, especially when a refrigeratory agent, as ice or brine, surrounds the receptacle 6.

The top of the receptacle has a neck or mouth 12 corresponding in width thereto so that an apertured or perforated platform 13 may be placed in the receptacle 6 in spaced relation to the bottom thereof. It is upon this platform that bricks of ice cream or other matter may be placed and conveniently packed in the ends of the receptacle, as well as the central portion thereof. When the ice cream bricks are removed from the central portion of the receptacle, then easy access may be had to the ice cream in either end thereof, consequently it is possible to store different flavors of ice cream in the receptacle. With the platform 13 made in two sections it can be easily placed in and removed from the receptacle 6.

A lid 14 snugly fits on the neck or mouth 12 of the receptacle 6 in proximity to the opening closed by the auxiliary lid 5, the opening being designated 15 and of sufficient size to permit of the lid 14 being removed therethrough. It will be noted that the neck or mouth 12 is in proximity to the walls of the opening 15, consequently there is a minimum space for heat to reach the refrigeratory agent within the inner shell and around the receptacle 6, thus prolonging the use of the ice and maintaining the ice cream in perfect condition.

The ice box or cabinet is provided with a suitable drain pipe 16 that may be controlled by a valve 17, said drain pipe being located in one of the insulated end walls of the box, but in some instances may extend out of the bottom thereof.

The refrigerator box or cabinet can also be used for ice cream in the bulk, by removing the receptacle 6 and substituting the lid shown in Fig. 4 for the lid shown in Fig. 1. The lid shown in Fig. 4 has two openings 18 closed by auxiliary lids 19 and the two openings 18 will permit of easy access being had to the upper ends of cans of ice cream placed in the ends of the box or cabinet. It is in this connection that the box or cabinet can be made of such a size as to hold a plurality of ice cream cans with a lid for the box or cabinet permitting of easy access being had to either can.

It is thought that the utility of my invention will be apparent without further description, and while in the drawing there is illustrated a preferred embodiment of my invention, it is to be understood that the structural elements are susceptible to such changes in size, shape and manner of assemblage as fall within the scope of the appended claim.

What I claim is:—

An oblong receptacle for a refrigerator box adapted to be surrounded by a refrigeratory agent in the box, transverse feet at the ends of said receptacle engaging the walls of the box and maintaining said receptacle in spaced relation thereto, said receptacle having the top thereof intermediate its ends provided with an opening corresponding in width to said receptacle, a lid for the opening of said receptacle, a perforated platform at the bottom of said receptacle, and means on the sides of said receptacle intermediate the ends thereof adapted to engage the box and hold said receptacle against flotation within the box.

In testimony whereof I affix my signature in the presence of two witnesses.

HERMAN ROHRBECK.

Witnesses:
KARL H. BUTLER,
ANNA M. DORR.

Copies of this patent may be obtained for five cents each, by addressing the "Commissioner of Patents, Washington, D. C."